United States Patent [19]
Banks et al.

[11] Patent Number: 5,828,297
[45] Date of Patent: Oct. 27, 1998

[54] VEHICLE ANTI-THEFT SYSTEM

[75] Inventors: Donald L. Banks, Greenwood; William F. Collins, Columbus; Matthew W. Workman, Indianapolis; Auden E. Rovelle-Quartz, Columbus, all of Ind.

[73] Assignee: Cummins Engine Company, Inc., Columbus, Ind.

[21] Appl. No.: 882,520

[22] Filed: Jun. 25, 1997

[51] Int. Cl.$^6$ .................................................. B60R 25/10
[52] U.S. Cl. ........................... 340/426; 180/287; 180/167; 307/10.2; 307/10.3; 307/10.6; 123/179.4; 290/386; 290/38 C
[58] Field of Search ..................................... 340/426, 428, 340/430; 180/287, 167; 367/10.2, 10.3, 10.4, 10.5, 10.6; 123/179.4, 179.2, 179.3; 290/38 C, 38 D

[56] References Cited

U.S. PATENT DOCUMENTS

| | | |
|---|---|---|
| 2,022,725 | 12/1935 | Lazarus et al. . |
| 3,670,836 | 6/1972 | Tonkowich et al. . |
| 3,811,049 | 5/1974 | Hildreth et al. .................. 290/38 |
| 4,084,657 | 4/1978 | Bradley et al. .................. 180/114 |
| 4,596,303 | 6/1986 | Tremblay . |
| 4,884,207 | 11/1989 | Asada et al. . |
| 4,991,683 | 2/1991 | Garretto et al. . |
| 5,024,186 | 6/1991 | Long et al. ..................... 307/10.6 |
| 5,042,439 | 8/1991 | Tholl et al. ..................... 180/167 |
| 5,045,837 | 9/1991 | Gosker . |
| 5,303,163 | 4/1994 | Ebaugh et al. . |
| 5,307,048 | 4/1994 | Sonders ......................... 340/426 |
| 5,345,902 | 9/1994 | Kalail, Sr. et al. . |
| 5,377,641 | 1/1995 | Salazar ........................... 123/179.4 |
| 5,394,135 | 2/1995 | Stadler ........................... 340/426 |
| 5,396,216 | 3/1995 | Morgan .......................... 340/426 |
| 5,444,861 | 8/1995 | Adamec et al. ................ 362/975.1 |
| 5,463,372 | 10/1995 | Mawyer ......................... 340/426 |
| 5,574,425 | 11/1996 | Shu ................................ 340/426 |
| 5,601,058 | 2/1997 | Dyches et al. ................. 123/179.2 |
| 5,621,252 | 4/1997 | Bucknam ....................... 307/10.2 |
| 5,635,901 | 6/1997 | Weinblatt ....................... 340/426 |
| 5,673,017 | 9/1997 | Dery et al. ..................... 340/426 |

FOREIGN PATENT DOCUMENTS

2200086   7/1988   United Kingdom .

*Primary Examiner*—Nina Tong
*Attorney, Agent, or Firm*—Woodard, Emhardt, Naughton, Moriarty & McNett

[57] ABSTRACT

A vehicle anti-theft system includes an engine control computer operable to control engine fueling in a normal mode of operation according to operator demand via an accelerator pedal, and a code interface module responsive to a predefined security code to set the engine control computer in a secure mode of operation. In the secure mode, two fuel enabling values in the engine fueling algorithm are altered. Specifically, an engine startup enable value is altered so that the engine control computer disables fueling if the engine is not running, to thereby prevent an unauthorized individual from starting the engine. Likewise, an accelerator enable value is altered so that the engine control computer disregards the accelerator signal and controls fueling of the engine to thereby maintain an engine idling condition. The control computer is reset to its normal fueling control mode by re-entering the security code.

24 Claims, 7 Drawing Sheets

VEHICLE ANTI-THEFT SYSTEM

FIELD OF THE INVENTION

The present invention relates generally to vehicle anti-theft systems, and more specifically to such systems for operable to control the fueling of an electronically controlled internal combustion engine to thereby prevent unauthorized use of the vehicle.

BACKGROUND OF THE INVENTION

Vehicle anti-theft systems may be manifested in accordance with a variety of known techniques. For example, one known class of vehicle anti-theft systems include an alarm which emits a warning signal when unauthorized vehicle access is obtained. Another known class of vehicle anti-theft systems permit unauthorized access to, and operation of, a vehicle, but include elaborate tracking systems which allow law enforcement personnel or a monitoring service to locate and/or track the position of the stolen vehicle. Still another known class of vehicle anti-theft systems include provisions for selectively altering normal vehicle operation to thereby hinder the progress of a would be vehicle thief. It is this latter class of vehicle anti-theft systems that the present invention is concerned with.

Vehicle anti-theft systems that include provisions for selectively altering normal vehicle operation typically include mechanical and/or electrical subsystems that inhibit normal operation of the vehicle electrical system, engine fueling system or other vehicle/engine functions. In those systems which alter the operation of the engine fueling system, it is known to provide mechanical and/or electrical apparatuses between the fuel control system and the fuel dispensing system for altering fuel delivery to the engine. For example, U.S. Pat. Nos. 2,022,725 to Lazarus et al., 3,670,836 to Tonkowich et al. and 5,045,837 to Gosker all disclose fuel altering devices having a valve disposed in a vehicle fuel line which is actuatable to cut off fuel to the engine fueling system. U.S. Pat. No. 4,048,657 to Bradley et al. discloses a similar valve-based system that is actuatable to supply a reduced fuel flow to the engine to thereby operate the engine at idle speed. U.S. Pat. Nos. 4,884,207 to Asada et al., 4,991,683 to Garretto et al. and 5,345,902 to Kalail et al. all disclose systems having an electrically controlled switch actuatable to cause an electrically controlled fuel pump circuit to shut off fuel delivery to the engine.

While each of the foregoing prior art systems are operable to provide at least some measure of vehicle theft protection, all have drawbacks associated therewith. For example, each of these systems may be defeated by providing for either a fuel bypass path or alteration of the electrical signal provided to the fuel pump circuit. As another example, each of the prior art systems require mechanical and/or electrical componentry in addition to that necessary for normal engine operation. Provisions must therefore be made either in the engine compartment or in the vehicle for housing such additional componentry. Furthermore, such added componentry increases the number of components and/or subsystems subject to failure. Moreover, failure of any such components and/or subsystems may render the vehicle inoperative until such time that suitable repairs can be made.

Concern over the foregoing drawbacks of prior art vehicle anti-theft systems are heightened in the heavy duty truck industry. Such vehicles are often left unattended either with the engine idling (and with the cab typically locked), or parked in an open area with the engine shut down. In either case, thieves having sufficient knowledge to bypass known anti-theft devices may easily and quickly do so while the truck is left unattended. Moreover, failure of one of the prior art devices in a heavy duty truck may be too costly, in terms of down time, to justify inclusion of such a system in the truck to begin with. What is therefore needed, particularly in the heavy duty truck industry, is a vehicle anti-theft system that is not easily defeated or tampered with, and that minimizes additional componentry over that required to fuel the engine under normal operating conditions, and that allows an authorized vehicle operator to protect against vehicle theft both when the vehicle is locked and idling or parked and shut down.

SUMMARY OF THE INVENTION

The foregoing shortcomings of the prior art are addressed by the present invention. In accordance with one aspect of the present invention, a vehicle anti-theft system comprises means for producing a security code signal, means for producing an accelerator signal, an engine fueling system responsive to at least one fueling signal to provide fuel delivery to an internal combustion engine of the vehicle, means for determining an operational state of the engine and producing an engine operational state signal corresponding thereto, and a control computer normally responsive to the accelerator signal to produce the at least one fueling signal in accordance therewith. The control computer is responsive to a first occurrence of the security code signal and the engine operational state signal to modify the at least one fueling signal to thereby maintain an engine idling state regardless of the accelerator signal if the engine is running.

In accordance with another aspect of the present invention, a vehicle anti-theft system comprises means for producing a security code signal, an engine fueling system responsive to at least one fueling signal to provide fuel delivery to an internal combustion engine of the vehicle, means for determining an operational state of the engine and producing an engine operational state signal corresponding thereto, and a control computer for producing the at least one fueling signal. The computer is responsive to a first occurrence of the security code signal and the engine operational state signal to modify the at least one fueling signal to thereby disable fuel delivery to the engine if the engine is not operating.

In accordance with a further aspect of the present invention, a vehicle anti-theft system comprising means for producing a security code signal, means for determining an operational state of an internal combustion engine of a vehicle and producing an engine operational state signal corresponding thereto, means for determining vehicle motion and producing a vehicle motion signal corresponding thereto, and a control computer for controlling the engine. The computer is responsive to a first occurrence of the security code signal to enter a secure mode of operation, wherein the computer is responsive to the vehicle motion signal and the engine operational state signal to shut down the engine if the engine is operating and the vehicle is moving.

In accordance with yet another aspect of the present invention, a vehicle anti-theft system comprises means for producing a security code signal, means for producing an accelerator signal, an engine fueling system responsive to at least one fueling signal to provide fuel delivery to an internal combustion engine of the vehicle, means responsive to vehicle motion to produce a vehicle motion signal corresponding thereto, and a control computer for controlling the engine fueling system. The control computer operable in a normal mode of operation wherein the computer is responsive to the accelerator signal to produce the at least one fueling signal in accordance therewith, and in a secure mode of operation wherein the computer is responsive to the security code signal to modify the at least one fueling signal to prevent unauthorized vehicle use, wherein the control computer is responsive to the vehicle motion signal to enter the secure mode of operation only if the vehicle is stationary.

In accordance with still another aspect of the present invention, a method of controlling engine fueling to thereby prevent unauthorized operation of a vehicle is implemented in a control computer for electronically controlling an internal combustion engine of the vehicle, wherein the method comprises the steps of receiving a predefined security code, monitoring vehicle motion, setting a security flag in the control computer in response to receiving the predefined security code if the security flag is not set and if the vehicle is stationary, determining an engine operational state, and controlling the engine according to a secure mode of engine operation in response to a presence of the security flag in the control computer by disabling engine fueling to thereby prevent the engine from starting if the engine is not running, and by controlling engine fueling to thereby maintain an engine idling speed if the engine is running.

In accordance with still a further aspect of the present invention, a method of controlling engine fueling to thereby prevent unauthorized operation of a vehicle is implemented in a control computer for electronically controlling an internal combustion engine of the vehicle, wherein the method comprises the steps of receiving a predefined security code, monitoring vehicle motion, setting a security flag in the control computer in response to receiving the predefined security code if the security flag is not set and if the vehicle is stationary, determining an engine operational state, and controlling the engine according to a secure mode of engine operation in response to a presence of the security flag in the control computer by disabling engine fueling to thereby prevent the engine from starting if the engine is not running, and by automatically shutting down the engine and disabling fueling to prevent restarting thereof if the engine is running.

One object of the present invention is to provide a system for preventing unauthorized use of a vehicle by controlling the fueling of its electronically controlled internal combustion engine.

Another object of the present invention is to provide such a system which is responsive to a predefined security code to disable the engine from starting if the engine is not running, and to maintain an engine idling state if the engine is running.

A further object of the present invention is to provide such a system which is responsive to a predefined security code to disable the engine from starting if the engine is not running, and to automatically shut down the engine and disable engine restart if the engine is running.

Yet another object of the present invention is to provide such a system which may be set in a secure mode of engine control by entering the security code, or alternatively by actuating a panic switch, only when the vehicle is stationary.

Still another object of the present invention is to provide such a system which may be restored to normal engine control operation by re-entering the security code.

These and other objects of the present invention will become more apparent from the following description of the preferred embodiments.

DESCRIPTION OF THE PREFERRED EMBODIMENTS

For the purposes of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated devices, and such further applications of the principles of the invention as illustrated therein being contemplated as would normally occur to one skilled in the art to which the invention relates.

Figure 1:
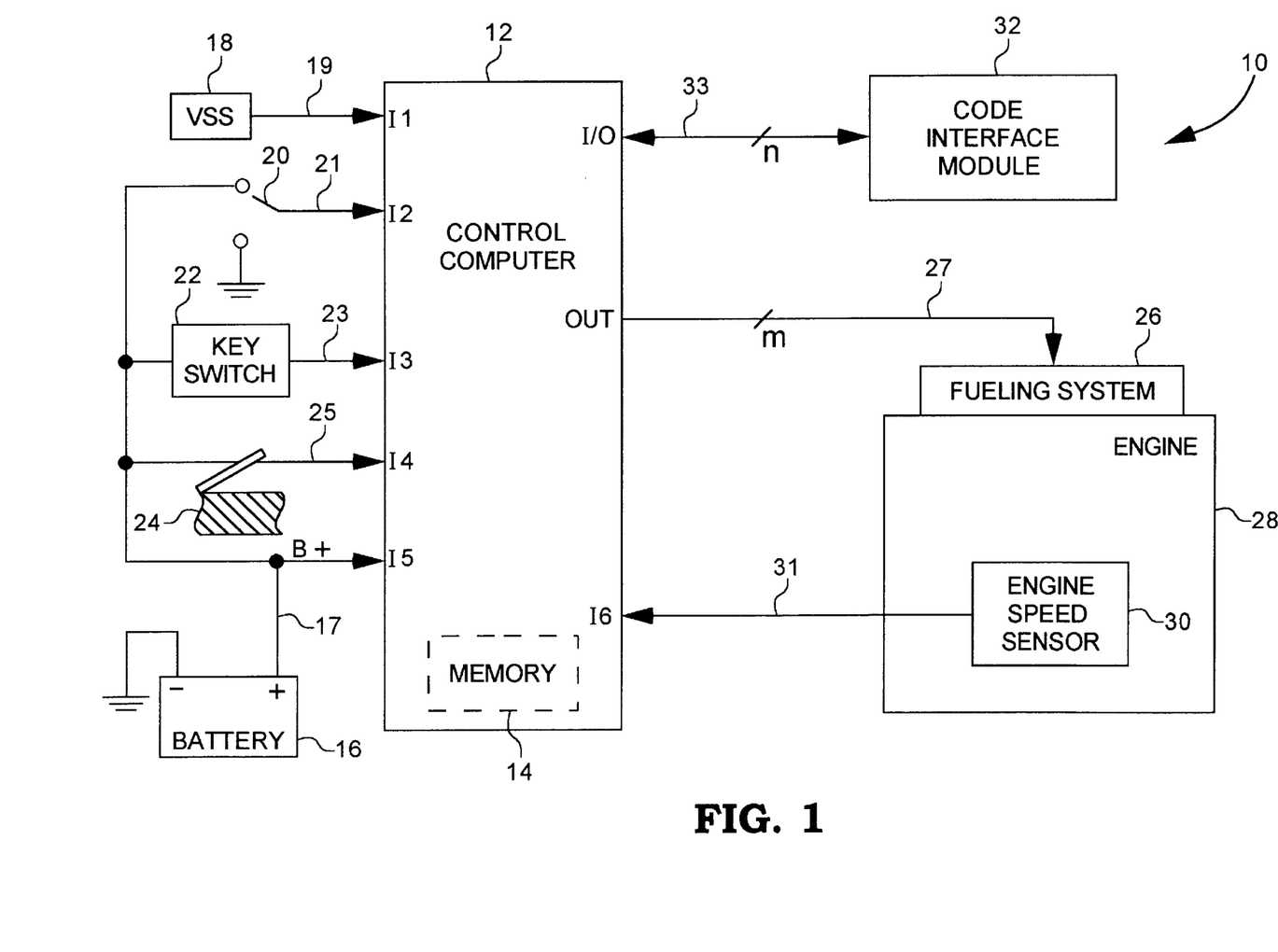
FIG. 1 is a diagrammatic illustration of one embodiment of a vehicle anti-theft system, in accordance with the present invention.

Referring now to FIG. 1, a vehicle anti-theft system 10, in accordance with the present invention, is shown. Central to system 10 is a control computer 12, which is preferably microprocessor-based, and which includes at least a memory 14. Control computer 12 is operable to control at least the fueling system 26 of an internal combustion engine 28, and may further control other engine and/or vehicle functions. In one embodiment, control computer 12 is an engine control module (ECM), engine control unit (ECU) or other known engine control computer. Control computer 12 is powered by a vehicle battery 16 of known construction. Battery 16 provides a battery voltage B+ on power line 17, which is received by control computer 12 at input I5. Control computer 12 typically includes voltage regulator circuitry (not shown) which converts the battery voltage B+ to a regulated logic level voltage for powering logic circuits contained within computer 12.

System 10 further includes a vehicle speed sensor 18 operable to provide a vehicle speed signal to input I1 of control computer 12 via signal path 19. Vehicle speed sensor 18 is preferably a rotational speed sensor operable to sense rotational speed of a tailshaft of the vehicle and provide a corresponding signal to control computer 12. As it relates to the present invention, however, sensor 12 need only provide a signal that distinguishes between a stationary vehicle condition and a vehicle moving condition. In this sense, sensor 18 may alternatively be any known vehicle motion sensor operable to provide control computer 12 with a signal indicative of motion of the vehicle, either in a forward or reverse direction.

System 10 further includes a panic switch 20 providing a panic signal to input I2 of control computer 12 via signal path 21. Preferably, switch 20 has a first input terminal connected to power line 17 and a second input terminal connected to ground potential, such that the panic signal is switchable between B+ and ground. Alternatively, the switch terminal connected to B+ may be connected instead to an output of a logic level voltage regulator such that the panic signal is switchable between high and low logic levels. In either case, panic switch is preferably located in an unobvious location within the cab area of the vehicle, yet easily accessible by the vehicle operator. As will be explained in greater detail hereinafter, panic switch 20 may be actuated by the vehicle operator to set control computer 12 in a secure mode of engine fueling control.

System 10 further includes a key switch 22 operable to provide a switched battery signal to input I3 of control computer 12 via signal path 23. Key switch 22 is preferably a known vehicle key switch having "off", "on" and "crank" positions. As is known in the art, key switch 22 may be switched from the "off" position to the "on" position to thereby connect control computer 12 and other components of the vehicle electrical system to power line 17. Key switch 22 may further be temporarily switched from the "on" position to the "crank" position to thereby start the engine. Once the engine is started, the key switch 22 typically returns automatically to the "on" position. Key switch 22 may be switched from the "on" position to the "off" position to thereby shut down the engine.

System 10 further includes a known accelerator pedal, or accelerator, 24 responsive to operator actuation thereof to provide a corresponding accelerator signal to input I4 of control computer 12 via signal path 25. Preferably, accelerator pedal 24 includes a potentiometer having one end connected to power line 17, its opposite end connected to ground potential, and a wiper connected to signal path 25 such that the accelerator signal is an analog voltage ranging between B+ and ground. Alternatively, the present invention contemplates that accelerator pedal 24 may have other known componentry for providing an analog or digital accelerator signal on signal path 25 indicative of operator demand therefor.

System 10 further includes an internal combustion engine 28 having a known engine fueling system 26 operatively connected thereto as is known in the art. An output OUT of control computer 12 provides one or more fueling signals to fueling system 26 via "m" signal paths 27 as is known in the art, wherein m may be any integer. Engine 28 includes an engine speed sensor 30 operable to sense engine rotational speed and provide an engine speed signal corresponding thereto to input I6 of control computer 12 via signal path 31.

As is known in the art, control computer 12 is operable, in a normal engine fueling control mode, to execute a fuel control algorithm to thereby provide fueling signals to engine fueling system 26 according, at least in part, to the accelerator signal provided to computer 12 on signal path 25. The engine speed sensor 30 provides an engine speed feedback signal to control computer 12 via signal path 31, and the control computer 12 adjusts the fueling signals provided to fueling system 26 in accordance with known closed-loop engine speed governing techniques to thereby map the accelerator signal to a desired engine speed.

System 10 further includes a code interface module 32 connected to an input/output port I/O of control computer 12 via signal path 33. Signal path 33 may include any number, n, of individual signal lines, and is preferably an SAE J1587 datalink. As will be discussed in greater detail hereinafter, code interface module 32 is responsive to operator activation thereof to cause control computer 12 to operate in either a normal engine fueling mode, as discussed hereinabove, or a secure engine fueling mode, wherein control computer 12 is operable to modify the engine fueling signals provided on signal path 27 to thereby either disable the engine from starting or, if the engine is running, to maintain an engine idling condition thereof.

Figure 2:
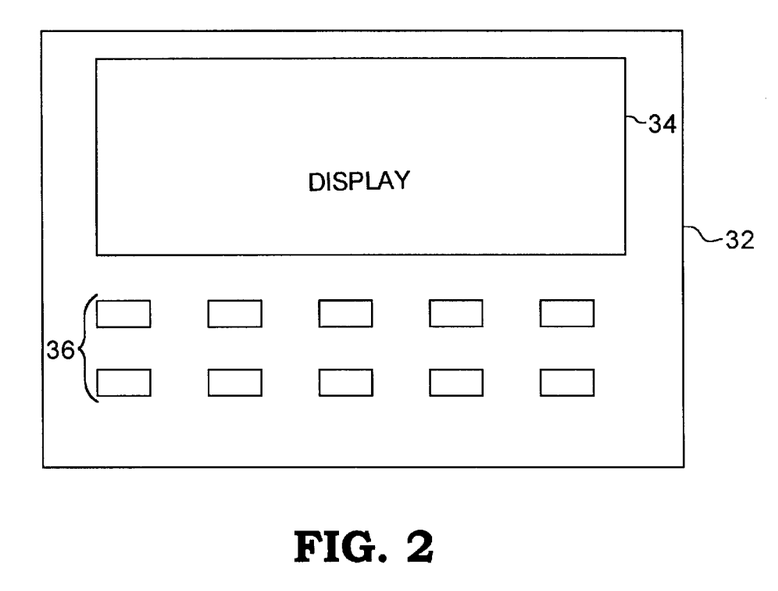
FIG. 2 is a diagrammatic illustration of one embodiment of the code interface module of the system of FIG. 1.

Referring now to FIG. 2, one preferred embodiment of code interface module 32 is shown illustrating some of its operator accessible features. Preferably, code interface module 32 includes a monitor 34 operable to display messages to the vehicle operator indicative of present engine fueling control mode of operation. Additionally, module 32 preferably includes a keypad 36 having a number of keys. Each key is responsive to operator actuation thereof to produce a unique key signal, as is known in the art.

Figure 3A:
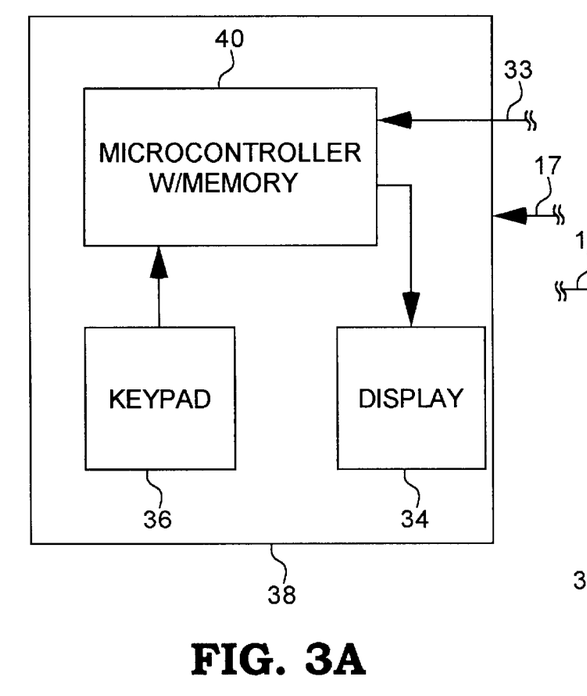
FIG. 3A is a diagrammatic illustration of one embodiment of the electrical hardware structure of the code interface module of FIG. 2.

Referring now to FIG. 3A, one preferred embodiment 38 of the internal hardware structure of code interface module 32 is shown. Embodiment 38 includes a microcontroller with memory 40, which is connected to signal path 33 and power line 17, and which is further connected in electrical communications with display 34 and keypad 36. One example of a code interface module 32 contemplated by the present invention, and which has at least the components described with respect to FIG. 3A, is disclosed in U.S. Pat. No. 5,303,163 to Ebaugh et al., which is assigned the assignee of the present invention, the contents of which are incorporated herein by reference.

Figure 3B:
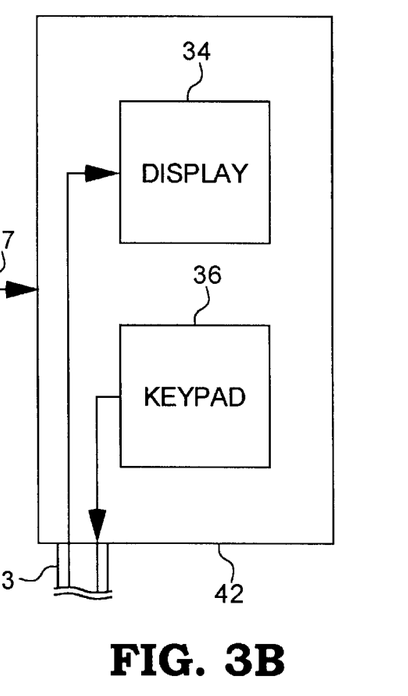
FIG. 3B is a diagrammatic illustration of an alternate embodiment of the electrical hardware structure of the code interface module of FIG. 2.

Referring now to FIG. 3B, an alternative embodiment 42 of the internal hardware structure of code interface module 32 is shown. Embodiment 42 includes only display 34 and keypad 36, both of which are electrically connected to signal path 33. Embodiment 42 preferably receives electrical power via power line 17. Embodiment 42 is preferably identical to embodiment 38 with the exception that microprocessor 40 is omitted therefrom. It is to be understood that if embodiment 42 is used as the code interface module 32, those tasks managed and controlled by microprocessor 40, as will be described hereinafter, are managed and controlled by control computer 12.

In operation, control computer 12 may be directed by the vehicle operator to control engine fueling in accordance with either a normal mode of operation or a secure mode of operation. In accordance with the present invention, the engine fueling control algorithm executed by control computer 12 preferably includes an engine startup enable value and an accelerator enable value, which values are preferably single bits of information. In the normal mode of engine fueling control, the engine startup value is set to enable engine startup, and the control computer 12 is responsive thereto to control engine fueling and timing to allow the engine to start in accordance with driver request. The accelerator enable value is similarly set in the normal mode of engine fueling to enable control computer 12 to be responsive to the accelerator signal provided on signal path 25 to produce engine fueling signals corresponding thereto on signal path 27. In the secure mode of engine fueling control, the engine startup value is set to disable engine startup, and the control computer 12 is responsive thereto to disable fuel flow to the engine so that the engine will not start. The accelerator enable value is set in the secure mode of engine fueling control to maintain an engine idling speed regardless of the accelerator signal on signal path 25.

The present invention contemplates two situations in which the vehicle operator may wish to configure control computer 12 in the secure mode of operation. A first is when the vehicle is parked and shut down, and the second is when the vehicle is left idling. In each of these situations, it is desirable to protect the vehicle from theft. Assuming that control computer 12 is controlling engine fueling in accordance with the normal mode of operation, as described hereinabove, code interface module 32 will display a message, via display 34, that the vehicle anti-theft system 10 is "unlocked". In accordance with the present invention, the vehicle operator may set system 10 in the secure mode of operation in one of two ways. Under normal conditions, if the operator desires to either shut down the engine or leave the vehicle unattended with the engine idling, control computer 12 may be set in the secure mode of operation by entering a security code at keypad 36 comprising a predetermined sequence of key signals. In one preferred embodiment, the security code is a four-digit personal identification number (PIN), although the present invention contemplates that the security code may be a sequence, or multiple sequences, of any number of key signals. If the code interface module 32 includes a microprocessor, this microprocessor is operable to determine whether the security code is valid and, if so, send a signal to control computer 12 to cause computer 12 to enter into the secure mode of engine fueling control. If the code interface module 32 does not contain a microprocessor, the security code is decoded by control computer 12 which then processes the code as described above. In either case, the control computer 12 preferably enters the secure mode of engine fueling control only if the vehicle is stationary. The control computer 12 therefore monitors the vehicle speed sensor 18, or other means for determining vehicle motion as discussed hereinabove, and enters the secure mode of engine fueling control upon a request therefor only if the vehicle is stationary. The vehicle motion check is a preferred safety feature which prevents the secure mode of operation from being entered during vehicle travel.

The present invention recognizes that certain panic situations may occur when the vehicle operator would like to set control computer 12 in the secure mode of operation, but does not have an opportunity to do so. For example, a would be thief might wait until the vehicle operator starts the engine, and then approach the cab and order the operator out of the vehicle. In circumstances wherein the vehicle operator does not have an opportunity to enter the security code into code interface module 32 to thereby set control computer 12 into a secure mode of operation, the operator may actuate the panic switch 20. Panic switch 20 provides a panic signal to control computer 12 on signal path 21, and the control computer 12 is responsive thereto to automatically enter the secure mode of engine fueling control. Those skilled in the art will recognize that panic switch 20 may alternatively interface with code interface module 32 such that module 32 is operable to provide control computer 12 with the panic signal via signal path 33. As with the security code provided by module 32, control computer 12 will only enter the secure mode of engine fueling control, pursuant to actuation of the panic switch 20, if the vehicle is stationary.

In the secure mode of engine fueling control (i.e. "locked" condition), control computer 12 is operable to monitor the operating status of the engine and control engine fueling accordingly. Preferably, control computer 12 determines whether the engine is running by monitoring the engine speed sensor 30. As this function relates to the present invention, those skilled in the art will recognize that other known means for determining the operational state of the engine may be used instead of the engine speed sensor 30. For example, control computer 12 may monitor engine fueling, engine load or other known indicators to determine whether the engine is running. In any case, if the engine is not running, control computer 12 is operable, as described above, to disable the engine from starting. If the engine is running, the control computer 12 is operable, as described above, to maintain engine operation at an engine idling speed.

Once set in the secure mode of operation, control computer 12 may not be reset (i.e. "unlocked") to the normal mode of engine fueling control via the panic switch, but must rather be reset by entering the predefined security code into code interface module 32. If the engine is shut down, the vehicle operator switches key switch 22 to the "on" position and enters the security code into the code interface module 32. If the engine is operating, the vehicle operator simply enters the security code into module 32. In either case, control computer 12 is operable, as described above, to enter into the normal mode of engine fueling control. It is to be understood that while one preferred device for providing the security code signal is keypad 36, the present invention contemplates that other known devices and/or subsystems may be used to enter the security code information. For example, keypad 36 may be replaced with a proximity or other card reader operable to read information provided on a magnetic strip of an access card, a memory disk reading device, voice recognition system or other known information transfer device/system. Further, the present invention contemplates that the code interface module 32 or control computer 12 may include a cellular or other data transceiver operable to receive a security code from a remote location. For example, a fleet owner/manager may wish to keep the control computers 12 of currently unused vehicles in a secure mode of engine fueling control until such time as the vehicle is needed. At that time, the fleet owner/operator may transmit the security code to the vehicle, and the control computer 12 is operable to receive the security code and automatically enter the normal mode of engine fueling control. Regardless of the specific means by which the security code is provided to control computer 12, it is to be understood that the present invention contemplates that the security code may be programmed at any time for a specific security code sequence of signals by the vehicle operator and/or fleet owner/manager.

Figure 4:
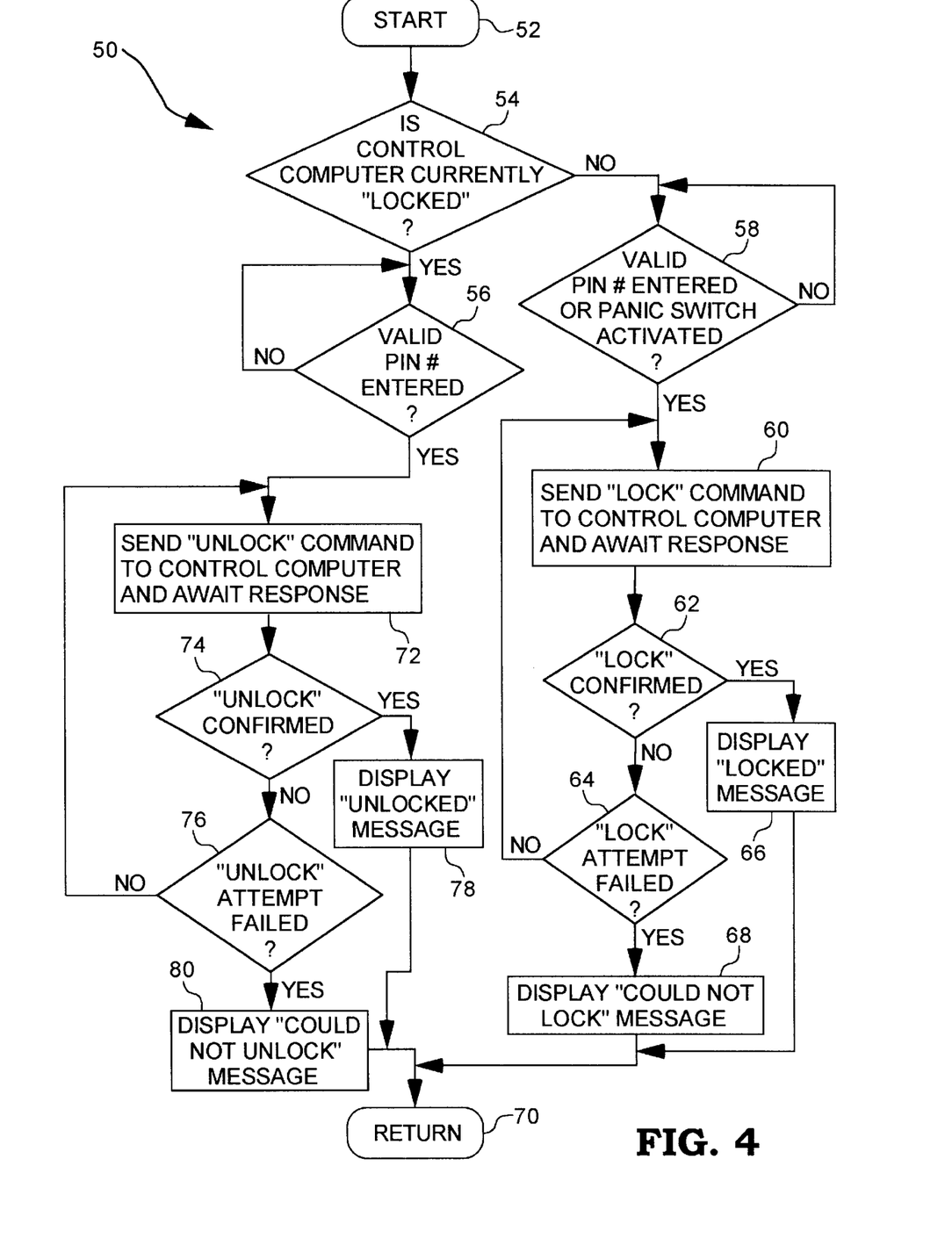
FIG. 4 is a flow chart illustrating one embodiment of a software algorithm for setting the control computer of FIG. 1 in secure and normal engine control modes of operation, in accordance with another aspect of the present invention.

Referring now to FIG. 4, a flow chart is shown illustrating one embodiment of a software algorithm 50 for "locking" and "unlocking" control computer 12 (i.e. setting control computer 12 in the secure and normal engine fueling control modes respectively). Preferably, algorithm 50 is executed by microprocessor 40 of code interface module 32, although algorithm 50 may be executed by control computer 12 if code interface module 32 does not include a microprocessor. Those skilled in the art will recognize that only minor modifications to algorithm 50 need be made in order to adapt the algorithm for execution by control computer 12. In any event, algorithm 50 begins at step 52 and at step 54, microprocessor 40 determines whether the control computer 12 is currently "locked", i.e. set in the secure mode of engine fueling control. If not, algorithm execution continues at step 58. If so, algorithm execution continues at step 56 where microprocessor monitors keypad 36 for entrance of a valid PIN code. Step 56 continually loops back on itself until a valid PIN code is received, at which point algorithm execution continues at step 72.

At step 58, the vehicle anti-theft system 10 is currently "unlocked", i.e. set in the normal mode of engine fueling control, and algorithm 50 continually loops back on itself until either a valid PIN code is entered or the panic switch 20 is activated. It is to be understood that the present invention contemplates various levels of security associated with the entering of a valid PIN code at steps 56 and 58. In the embodiment illustrated in FIG. 4, the algorithm 50 simply loops back on steps 56 and 58 until a valid PIN code (or panic switch activation in the case of step 58) is received. Alternatively, algorithm 50 may be configured to ignore any PIN code information for a predetermined time period if a valid PIN code is not entered within some predefined number of attempts. Moreover, algorithm 50 may be configured to require any number of successive entries of a valid PIN code following entrance of one or more invalid PIN codes. Other known security measures may be included within algorithm 50, and any modifications to algorithm 50 required thereby will be readily apparent to those skilled in the art.

Algorithm execution continues from step 58 at step 60 where microprocessor 40 sends a "lock" command to the control computer 12 and awaits a response. The control computer 12 preferably receives the "lock" command, processes this command and replies in accordance with the software algorithm 90 illustrated in FIG. 5.

Figure 5:
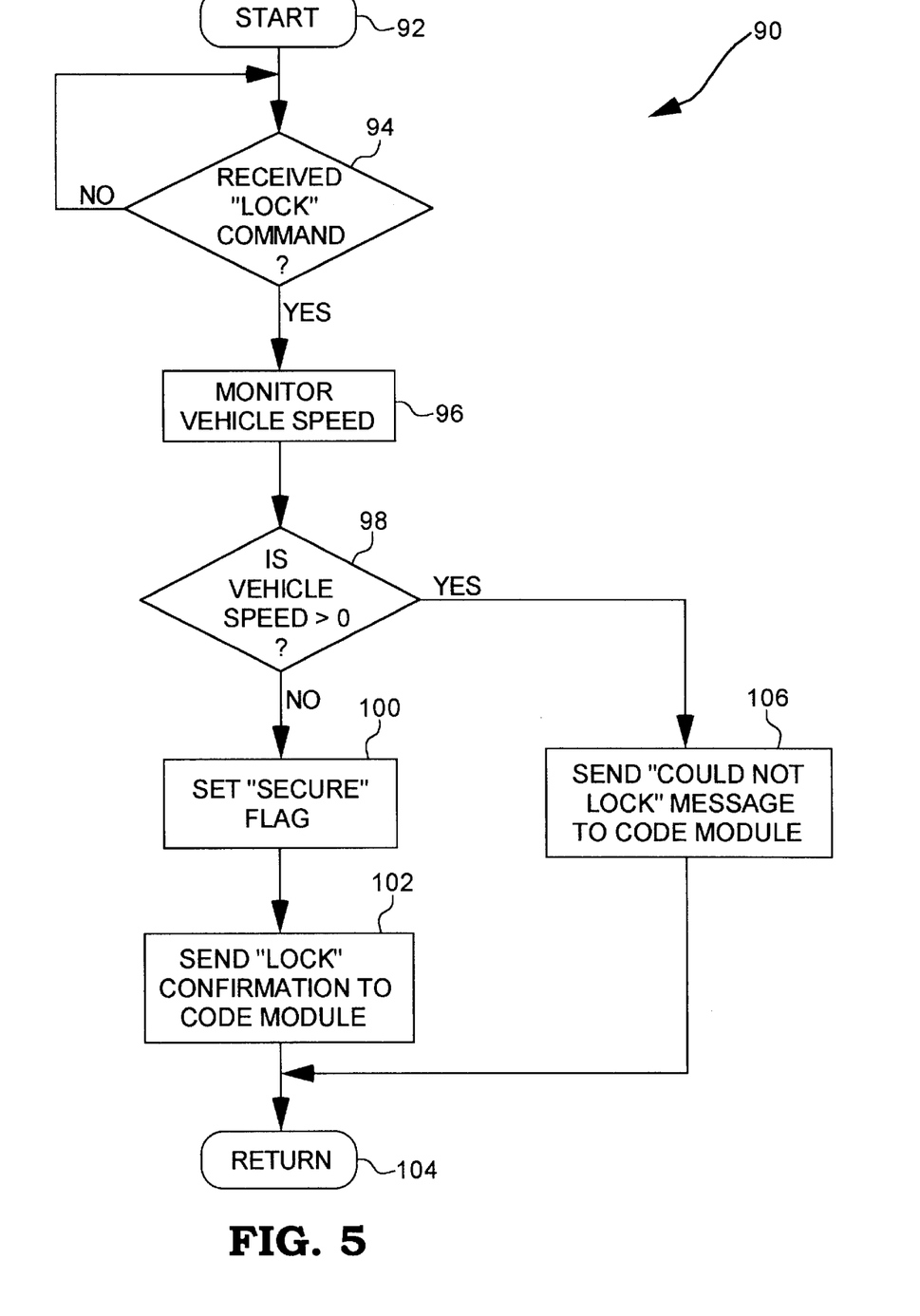
FIG. 5 is a flow chart illustrating one embodiment of a software algorithm for configuring the control computer of FIG. 1 for secure engine control operation.

Referring now to FIG. 5, algorithm 90 begins at step 92 and at step 94, control computer 12 continually loops back to step 94 until a "lock" command is provided by code interface module 32. Thereafter at step 96, control computer 12 monitors the vehicle speed sensor 18, or alternatively other means for providing a signal indicative of vehicle motion, and proceeds to step 98. At step 98, control computer 12 tests whether the vehicle is stationary or moving, preferably by testing whether the vehicle speed is greater than a predefined vehicle speed threshold. Although any vehicle speed threshold around zero may be used to define vehicle motion, a preferred vehicle speed threshold is zero mph. If, at step 98, the vehicle is stationary, algorithm execution continues at step 100. If, at step 98, the vehicle is moving, algorithm execution continues at step 106 where control computer 12 sends a "could not lock" message to code interface module 32, indicating that control computer 12 remains in the normal mode of engine fueling control, and thereafter continues at step 104 where the algorithm returns to its calling routine.

At step 100, control computer 12 has verified that the vehicle is stationary and proceeds to set a "secure" flag, which corresponds to altering the engine startup enable and accelerator enable values in the fueling control algorithm to thereby disable the engine from starting, if the engine is not running, or to maintain an engine idling speed regardless of the accelerator signal, as described hereinabove. Thereafter at step 102, control computer 12 sends a "lock" confirmation to the code interface module 32, indicating that control computer 12 is now in the secure mode of engine fueling control. Thereafter at step 104, algorithm 90 returns to its calling routine.

Referring again to FIG. 4, microprocessor 40 receives at step 60 either a "lock" confirmed or "could not lock" message from control computer 12. Thereafter at step 62, if a "lock" was confirmed then algorithm execution continues at step 66 where a "locked" message is displayed on monitor 34 of code interface module 32. If, at step 62, a "lock" was not confirmed, algorithm execution continues at step 64 where microprocessor 40 tests whether the "lock" attempt failed or whether a "lock" was simply not confirmed. If, at step 64, microprocessor 40 determines that a "lock" was not confirmed, algorithm execution loops back to step 60. If, at step 64, microprocessor 40 determines that the "lock" attempt failed, algorithm execution continues at step 68 where a "could not lock" message is displayed on display 34 of code interface module 32. From steps 66 and 68, algorithm execution continues at step 70 where the algorithm returns to its calling routine.

At step 72, microprocessor 40 has determined that the control computer 12 is currently "locked", and that a valid PIN code has been entered into code interface module 32 pursuant to a request by the vehicle operator to "unlock" control computer 12, i.e. set control computer 12 in the normal mode of engine fueling control. At step 72, microprocessor 40 sends an "unlock" command to control computer 12 and awaits a response. The control computer 12 preferably receives the "unlock" command, processes this command and replies in accordance with the software algorithm 110 illustrated in FIG. 6.

Figure 6:
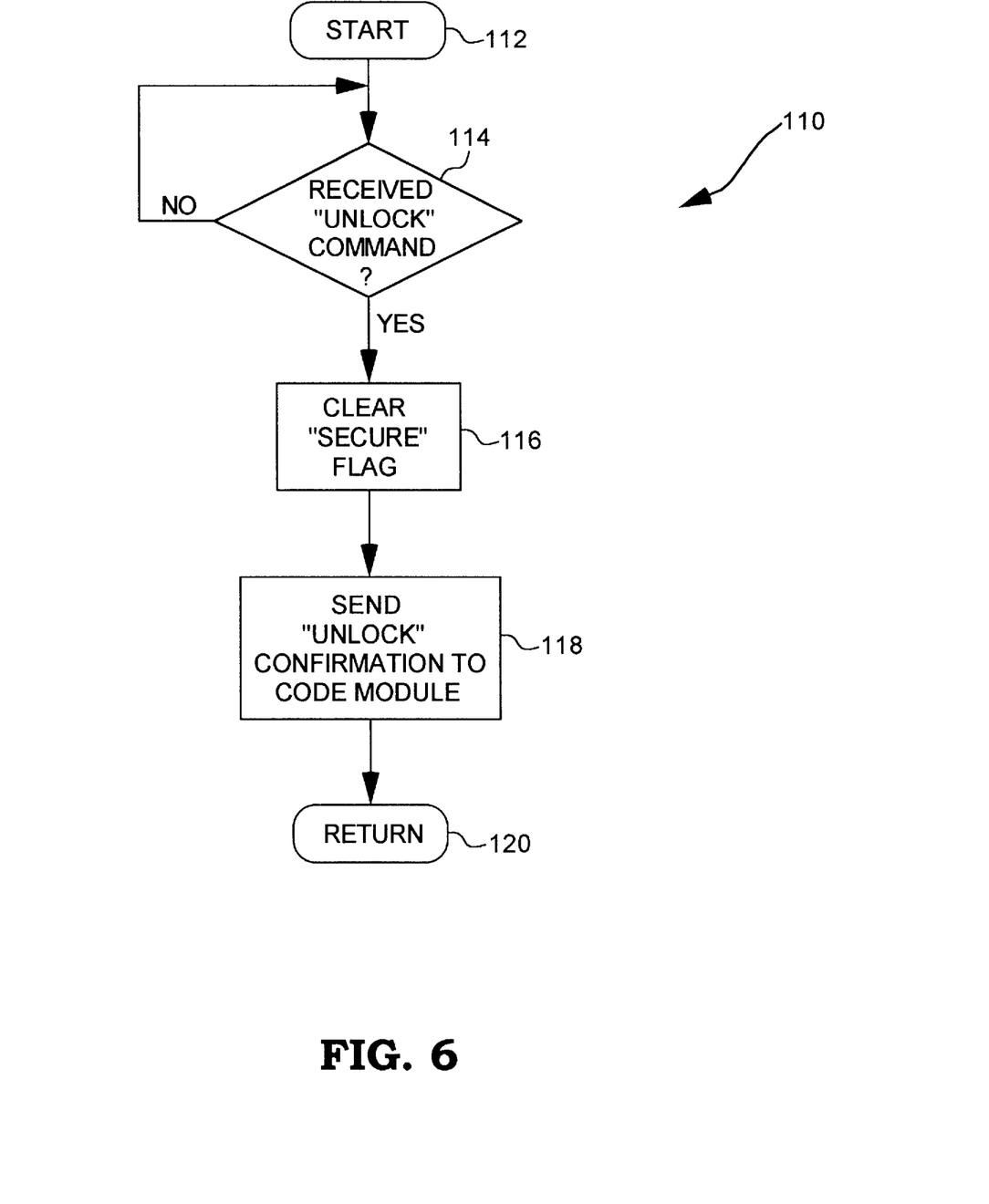
FIG. 6 is a flow chart illustrating one embodiment of a software algorithm for configuring the control computer of FIG. 1 for normal engine control operation.

Referring now to FIG. 6, algorithm 110 begins at step 112, and at step 114, control computer 12 continually loops back to step 114 until an "unlock" command is provided by code interface module 32. Thereafter at step 116, control computer 12 is responsive to the "unlock" command to clear the "secure" flag, which corresponds to resetting the engine startup enable and accelerator enable values in the fueling control algorithm to thereby enable the engine to start, if the engine is not running, or to return engine fueling to control by the accelerator pedal 24, as described hereinabove. Thereafter at step 118, control computer 12 sends an "unlock" command to the code interface module 32, indicating that control computer 12 is now in the normal mode of engine fueling control. Thereafter at step 120, algorithm 110 returns to its calling routine.

Referring again to FIG. 4, microprocessor 40 receives at step 72 an "unlock" command from control computer 12. Thereafter at step 74, microprocessor 40 tests whether an "unlock" was confirmed. If so, algorithm execution continues a step 78 where an "unlocked" message is displayed on display 34 of code interface module 32. If, at step 74, an "unlock" was not confirmed, algorithm execution continues at step 76 where microprocessor 40 tests whether the "unlock" attempt failed or was simply not confirmed. If, at step 76, microprocessor 40 determines that the "unlock" attempt was not confirmed, algorithm execution loops back to step 72. If, at step 76, microprocessor 40 determines that the "unlock" attempt failed, algorithm execution continues at step 80 where a "could not unlock" message is displayed on display 34 of code interface module 32. From steps 78 and 80, algorithm execution continues at step 70 where the algorithm is returned to its calling routine.

Figure 7:
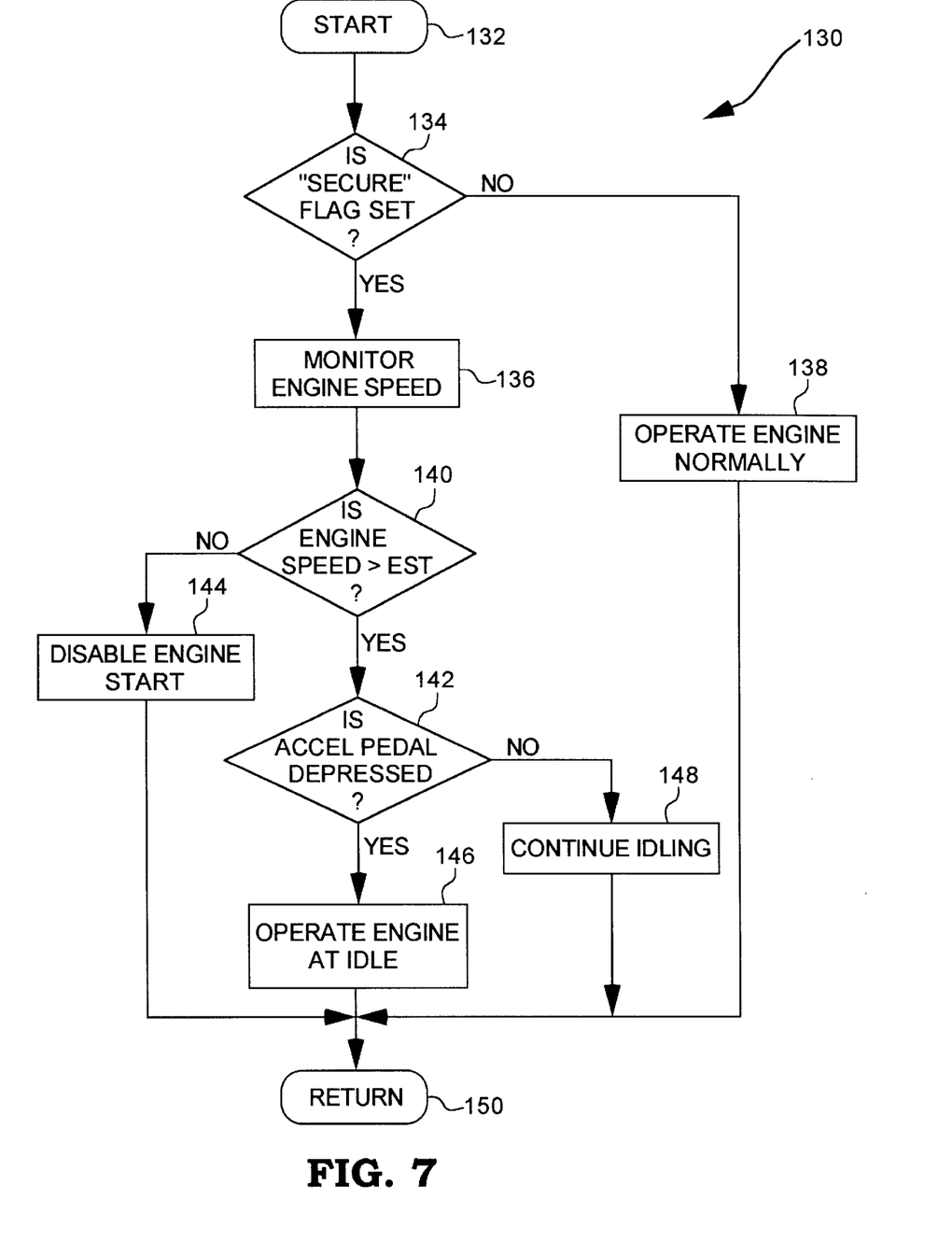
FIG. 7 is a flow chart illustrating one embodiment of a software algorithm for controlling the fueling of the internal combustion engine of FIG. 1 in a secure mode of operation.

Referring now to FIG. 7, a flow chart is shown illuatrating one embodiment of a software algorithm 130, executable by control computer 12, for controlling engine fueling in accordance with the secure mode of engine fueling control. Algorithm 130 begins at step 132, and at step 134, control computer 12 determines whether the "secure" flag has been set. If not, algorithm execution continues at step 138 where control computer 12 controls the engine fueling in accordance with the normal mode of engine fueling control. If, at step 134, control computer 12 determines that the "secure" flag is set, algorithm execution continues at step 136 where control computer 12 determines whether the engine is running or has been shut down. Preferably, control computer 12 executes step 136 by monitoring the engine speed sensor 30. If the engine speed signal provided on signal path 31 is above an engine speed threshold level (EST), then the engine is deemed to be running. Conversely, if the engine speed signal on signal path 31 is below EST, then the engine is deemed to be shut down or in a cranking mode. EST is accordingly set at some engine speed value between an engine running and an engine shut down condition. Alternatively, as discussed above, any known means may be used by control computer 12 at step 136 to determine whether the engine is running or has been shut down. It is to be understood that the present invention further contemplates using other EST values corresponding to other engine speed operating ranges/conditions.

Algorithm execution continues from step 136 at step 140 where control computer 12 tests the engine speed signal against EST. If the engine speed is below the EST, then control computer 12 considers the engine to be shut down and algorithm execution advances to step 144 where, in accordance with the altered engine startup enable value, control computer 12 alters the fueling signals provided on signal path 27 to thereby disable the engine from starting. If, on the other hand, control computer 12 determines that the engine speed is above EST at step 140, then control computer 12 considers the engine to be running and algorithm execution advances to step 142 where the status of the accelerator pedal 24 is tested. If, at step 142, control computer 12 determines that the accelerator pedal 24 is not depressed, then control computer 12 determines that the engine is currently idling, and advances to step 148 where control computer 12 continues to control engine fueling to maintain an engine idling condition. If, however, at step 142, control computer 12 determines that the accelerator pedal 24 is depressed, then according to the altered value of the accelerator enable value, as discussed hereinabove, control computer disregards the accelerator signal provided on signal path 25 and controls the fueling signals provided on signal path 27 to thereby maintain an engine idling condition. Algorithm execution continues from steps 138, 144, 146 and 148 to step 150 where algorithm 130 is returned to its calling routine.

Figure 8:
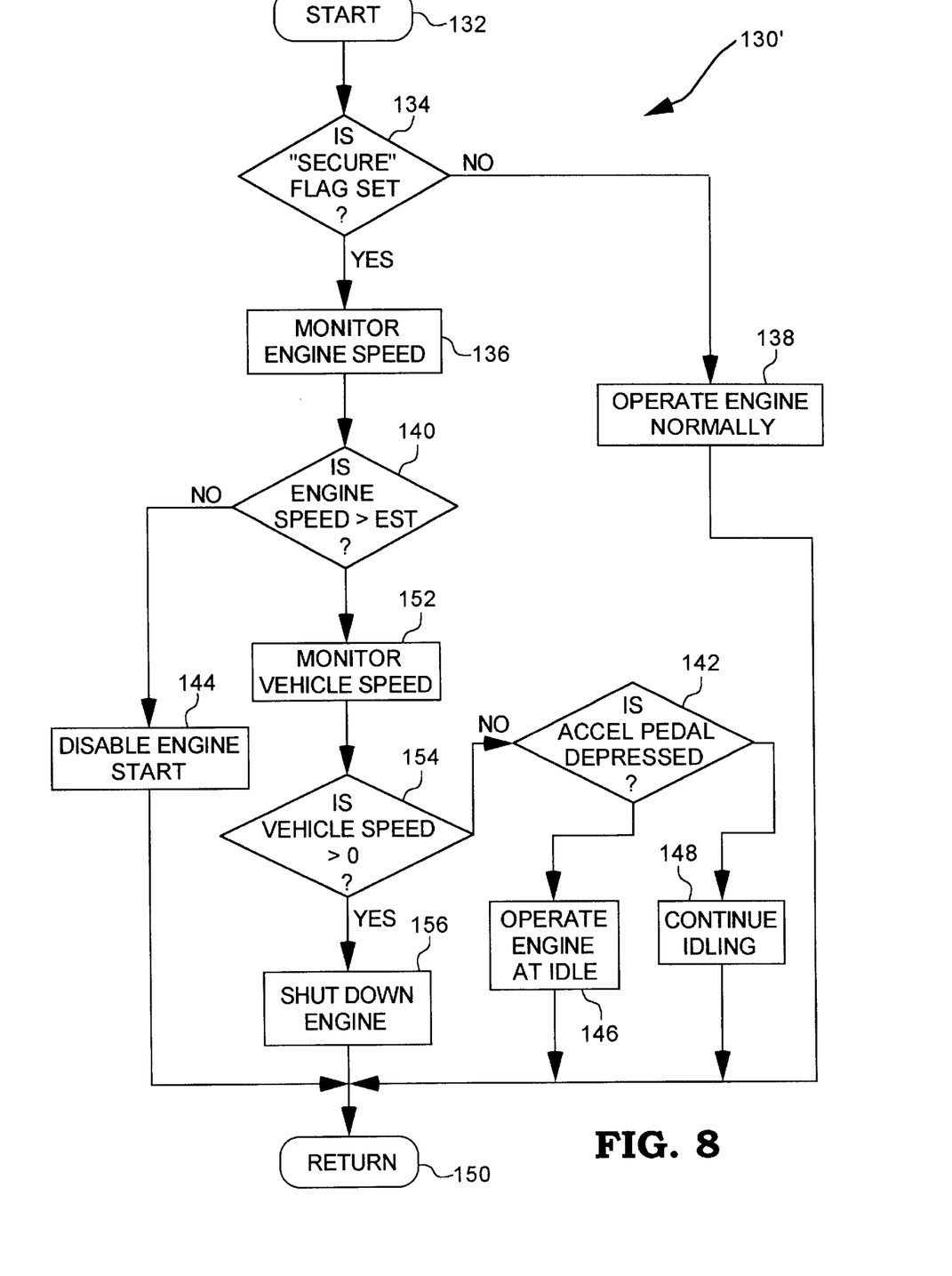
FIG. 8 is a flow chart illustrating an alternate embodiment of a software algorithm for controlling the fueling of the internal combustion engine of FIG. 1 in a secure mode of operation.

Referring now to FIG. 8, a flow chart is shown illustrating an alternate embodiment of a software algorithm 130', executable by control computer 12, for controlling engine fueling in accordance with the secure mode of engine fueling control. Algorithm is identical in many respects to algorithm 130 described above with respect to FIG. 7, and differs only in that steps 152–156 are added prior to step 142 in algorithm 130'. If control computer 12 determines, at step 140 that the engine speed signal in signal path 31 is greater than the engine speed threshold value EST, then algorithm execution continues at step 152 where control computer 12 monitors the vehicle speed signal (or other vehicle movement signal) on signal path 19. Thereafter at step 154, control computer 12 tests the vehicle speed signal on signal path 19 against the vehicle speed threshold value of step 98 of FIG. 5 (preferably zero vehicle speed). If, at step 154, the vehicle speed signal on signal path 19 is less than or equal to the vehicle speed threshold value, algorithm execution continues at step 142. If, at step 154, the vehicle speed signal on signal path 19 is greater than the vehicle speed threshold value, algorithm execution continues at step 156 where control computer 12 shuts down engine 28, preferably in accordance with a known automatic engine shutdown system/algorithm. Algorithm execution continues from step 156 at step 150 where algorithm 130' is returned to its calling routine.

In accordance with this alternate algorithm 130', the present invention recognizes that under engine idling conditions, the vehicle may in some situations be driven away, albeit at low vehicle speeds, without actuating accelerator pedal 24. In addressing this potential vehicle theft situation, algorithm 130' provides for monitoring the vehicle speed signal on signal path 19 when the engine 28 is running and the control computer 12 is set in the "secure" mode as described hereinabove. Under such conditions, if any vehicle movement is detected, control computer 12 automatically shuts down the engine 28 and thereafter disables engine restart unless and until a valid PIN code is received to "unlock" the system as described hereinabove. The accelerator disabling steps 142, 146 and 148, although optional in algorithm 130', are preferably retained therein to provide an additional level of security in the event that a vehicle speed (or motion) sensor failure occurs, or the vehicle speed (or motion) sensor is successfully bypassed to thereby simulate a vehicle stationary condition when in fact the vehicle is moving. As a practical matter, retaining accelerator disabling steps 142, 146 and 148 within algorithm 130' also serves to remind an authorized vehicle operator that the system is "locked". For example, if an authorized vehicle operator secures the vehicle in an engine idling mode and then forgets that the system is "locked" upon return, any attempt at actuation of accelerator pedal 24 has no effect on engine RPM and therefore instantly reminds the operator that the system is "locked". Without steps 142, 146 and 148, an authorized vehicle operator forgetting that the system is "locked" would only be reminded of the secure condition when an attempt is made to drive away, at which time algorithm 130' would automatically shut down the engine.

It should now be appreciated from the foregoing that the present invention overcomes the drawbacks associated with the prior art devices discussed in the BACKGROUND section. The vehicle anti-theft system 10 not only minimizes additional components, but further provides a tamper-proof system. For example, since the control computer 12 can only be set in the secure mode of engine fueling control via a specific set of software instructions, system 10 is not easily bypassable. Moreover, if a would be thief attempts to disconnect the code interface module from the datalink, the thief only succeeds in breaking the continuity required to reverse the protection logic.

While the invention has been illustrated and described in detail in the foregoing drawings and description, the same is to be considered as illustrative and not restrictive in character, it being understood that only the preferred embodiments have been shown and described and that all changes and modifications that come within the spirit of the invention are desired to be protected.

What is claimed is:

1. A vehicle anti-theft system comprising:

means for producing a security code signal;

means for producing an accelerator signal;

an engine fueling system responsive to at least one fueling signal to provide fuel delivery to an internal combustion engine of a vehicle;

means for determining an operational state of said engine and producing an engine operational state signal corresponding thereto; and a control computer normally responsive to said accelerator signal to produce said at least one fueling signal in accordance therewith, said control computer responsive to a first occurrence of said security code signal and said engine operational state signal to modify said at least one fueling signal to thereby maintain an engine idling state regardless of said accelerator signal if said engine is running.

2. The vehicle anti-theft system of claim 1 wherein said control computer is further responsive to a second occurrence of said security code signal to restore control of said at least one fueling signal in accordance with said accelerator signal.

3. The vehicle anti-theft system of claim 2 wherein said means for producing said security code signal includes means for detecting the security code or said panic detector, each operable to produce said security code signal;

and wherein said first occurrence of said security code signal is produced by either of said means for detecting a security code and said panic detector, and said second occurrence of said security code signal is produced only by said means for detecting the security code.

4. The vehicle anti-theft system of claim 3 wherein said means for detecting said security code includes:

a keypad having a number of keys each responsive to operator depression thereof to produce a unique key signal; and means responsive to a predefined combination of said unique key signals to produce said security code.

5. The vehicle anti-theft system of claim 2 wherein said control computer is further responsive to said first occurrence of said security code signal and said engine operational status signal to modify said at least one fueling signal to thereby disable fuel delivery to said engine if said engine is not running.

6. The vehicle anti-theft system of claim 5 wherein said control computer includes a first storage location storing an engine startup enable value therein and a second storage location storing an accelerator enable value therein;

and wherein said control computer is responsive to said first occurrence of said security code signal to alter said engine startup enable value to thereby disable engine startup, and to alter said accelerator enable value to thereby disable control of said engine fueling system in accordance with said accelerator signal;

and wherein said control computer is responsive to said second occurrence of said security code signal to alter said engine startup enable value to thereby enable engine startup, and to alter said accelerator enable value to thereby enable control of said engine fueling system in accordance with said accelerator signal.

7. A vehicle anti-theft system comprising:

means for producing a security code signal;

an engine fueling system responsive to at least one fueling signal to provide fuel delivery to an internal combustion engine of a vehicle;

means for determining an operational state of said engine and producing an engine operational state signal corresponding thereto; and a control computer for producing said at least one fueling signal, said computer responsive to a first occurrence of said security code signal and said engine operational state signal to modify said at least one fueling signal to thereby disable fuel delivery to said engine if said engine is not operating;

wherein said control computer is further responsive to a second occurrence of said security code signal to restore said at least one fueling signal to thereby enable fuel delivery to said engine;

wherein said means for producing the security code signal includes means for detecting a security code and a panic detector, each operable to produce said security code signal;

and wherein said first occurrence of said security code signal is produced by either of said means for detecting the security code or said panic detector, and said second security code signal is produced only by said means for detecting the security code.

8. The vehicle anti-theft system of claim 7 wherein said means for detecting the security code includes:

a keypad having a number of keys each responsive to operator depression thereof to produce a unique key signal; and means responsive to a predefined combination of said unique key signals to produce said security code.

9. A vehicle anti-theft system comprising:

means for producing a security code signal;

an engine fueling system responsive to at least one fueling signal to provide fuel delivery to an internal combustion engine of a vehicle;

means for determining an operational state of said engine and producing an engine operational state signal corresponding thereto; and a control computer for producing said at least one fueling signal, said computer responsive to a first occurrence of said security code signal and said engine operational state signal to modify said at least one fueling signal to thereby disable fuel delivery to said engine if said engine is not operating;

wherein said control computer is further responsive to a second occurrence of said security code signal to restore said at least one fueling signal to thereby enable fuel delivery to said engine;

wherein said control computer includes a storage location storing an engine startup enable value therein;

and wherein said control computer is responsive to said first occurrence of said security code signal to alter said engine startup enable value to disable fuel delivery to said engine to thereby prevent starting thereof;

and wherein said control computer is responsive to said second occurrence of said security code signal to alter said engine startup enable value to enable fuel delivery to said engine to thereby allow starting thereof.

10. A vehicle anti-theft system comprising:

means for producing a security code signal;

means for producing an accelerator signal;

an engine fueling system responsive to at least one fueling signal to provide fuel delivery to an internal combustion engine of a vehicle;

means responsive to vehicle motion to produce a vehicle motion signal corresponding thereto; and a control computer for controlling said engine fueling system, said control computer operable in a normal mode of operation wherein said computer is responsive to said accelerator signal to produce said at least one fueling signal in accordance therewith, and in a secure mode of operation wherein said computer is responsive to said security code signal to modify said at least one fueling signal to prevent unauthorized vehicle use, said control computer responsive to said vehicle motion signal to enter said secure mode of operation only if said vehicle is stationary.

11. The vehicle anti-theft system of claim 10 wherein said control computer is responsive to detection of a first occurrence of said security code signal to switch from said normal mode of operation to said secure mode of operation.

12. The vehicle anti-theft system of claim 11 wherein said control computer is responsive to detection of a second occurrence of said security code signal to switch from said secure mode of operation to said normal mode of operation.

13. The vehicle anti-theft system of claim 12 wherein said means for producing said security code signal includes means responsive to operator input of a predefined security code sequence for producing said security code signal and a panic switch operable to produce said security code signal;

and wherein said first occurrence of said security code signal is produced by either of said means responsive to operator input of the predefined security code sequence or said panic switch, and said second occurrence of said security code signal is produced only by said means responsive to operator input of the predefined security code sequence.

14. The vehicle anti-theft system of claim 10 further including means for determining an operational state of said engine and producing an engine operational state signal corresponding thereto;

and wherein said control computer is responsive to said engine operational state signal in said secure mode of operation to modify at least one fueling signal to thereby maintain an engine idling state regardless of said accelerator signal if said engine is operating, and to modify said at least one fueling signal to thereby disable fuel delivery to said engine if said engine is not operating.

15. In a control computer for electronically controlling an internal combustion engine of a vehicle, a method of controlling engine fueling to thereby prevent unauthorized operation of the vehicle, the method comprising the steps of:

receiving a predefined security code;

monitoring vehicle motion;

setting a security flag in the control computer in response to receiving the predefined security code if the security flag is not set and if the vehicle is stationary;

determining an engine operational state; and controlling the engine according to a secure mode of engine operation in response to a presence of the security flag in the control computer by disabling engine fueling to thereby prevent the engine from starting if the engine is not running, and by controlling engine fueling to thereby maintain an engine idling speed if the engine is running.

16. The method of claim 15 further including the steps of:

clearing the security flag from the control computer in response to receiving the predefined security code if the security flag is set; and controlling the engine according to a normal mode of engine operation in response to an absence of the security flag in the control computer by allowing startup of the engine is not running, and by controlling engine fueling in accordance with driver demand if the engine is running.

17. The method of claim 16 wherein the engine includes an accelerator, and wherein the control computer is responsive to operator control of the accelerator to provide fueling signals to a fueling system of the engine corresponding thereto, and wherein the step of setting the security flag in the control computer includes:

altering an engine startup enable value within an engine fueling control algorithm of the control computer to thereby disable engine startup; and altering an accelerator enable value within the engine fueling control algorithm of the control computer to thereby disable control of the fueling signals in accordance with operator control of the accelerator.

18. The method of claim 17 wherein the step of clearing the security flag in the control computer includes:

altering the engine startup enable value within the engine fueling control algorithm of the control computer to thereby enable engine startup; and altering the accelerator enable value within the engine fueling control algorithm of the control computer to thereby enable control of the fueling signals in accordance with operator control of the accelerator.

19. A vehicle anti-theft system comprising:

means for producing a security code signal;

means for determining an operational state of an internal combustion engine of a vehicle and producing an engine operational state signal corresponding thereto;

means for determining vehicle motion and producing a vehicle motion signal corresponding thereto; and a control computer for controlling said engine, said computer responsive to a first occurrence of said security code signal to enter a secure mode of operation, said computer responsive to said vehicle motion signal and said engine operational state signal in said secure mode of operation to shut down said engine if said engine is operating and the vehicle is moving;

wherein said control computer is further operable in said secure mode of operation after shutting down said engine to disable restarting of said engine until detection of a second occurrence of said security code signal; and an engine fueling system responsive to at least one fueling signal to provide fuel delivery to said engine;

and wherein said control computer is operable to disable restarting of said engine by modifying said at least one fueling signal to thereby disable fuel delivery to said engine;

and wherein said control computer is responsive to said second occurrence of said security code signal to restore said at least one fueling signal to thereby enable fuel delivery to said engine.

20. A vehicle anti-theft system comprising:

means for producing a security code signal;

means for determining an operational state of an internal combustion engine of a vehicle and producing an engine operational state signal corresponding thereto;

means for determining vehicle motion and producing a vehicle motion signal corresponding thereto; and a control computer for controlling said engine, said computer responsive to a first occurrence of said security code signal to enter a secure mode of operation, said computer responsive to said vehicle motion signal and said engine operational state signal in said secure mode of operation to shut down said engine if said engine is operating and the vehicle is moving;

wherein said control computer is further operable in said secure mode of operation after shutting down said engine to disable restarting of said engine until detection of a second occurrence of said security code signal; and wherein said means for producing the security code signal includes means for detecting a security code and a panic detector, each operable to produce said security code signal;

and wherein said first occurrence of said security code signal is produced by either of said means for detecting the security code and said panic detector, and said second security code signal is produced only by said means for detecting the security code.

21. The system of claim 20 wherein said means for detecting the security code includes:

a keypad having a number of keys each responsive to operator depression thereof to produce a unique key signal; and means responsive to a predefined combination of said unique key signals to produce said security code.

22. A vehicle anti-theft system comprising:

means for producing a security code signal;

means for determining an operational state of an internal combustion engine of a vehicle and producing an engine operational state signal corresponding thereto;

means for determining vehicle motion and producing a vehicle motion signal corresponding thereto; and a control computer for controlling said engine, said computer responsive to a first occurrence of said security code signal to enter a secure mode of operation, said computer responsive to said vehicle motion signal and said engine operational state signal in said secure mode of operation to shut down said engine if said engine is operating and the vehicle is moving;

wherein said control computer is further operable in said secure mode of operation after shutting down said engine to disable restarting of said engine until detection of a second occurrence of said security code signal; and wherein said control computer includes a storage location storing an engine startup enable value therein;

and wherein said control computer is responsive to said first occurrence of said security code signal to alter said engine startup enable value to thereby disable starting of said engine;

and wherein said control computer is responsive to said second occurrence of said security code signal to alter said engine startup enable value to thereby enable starting of said engine.

23. In a control computer for electronically controlling an internal combustion engine of a vehicle, a method of controlling engine fueling to thereby prevent unauthorized operation of the vehicle, the method comprising the steps of:

receiving a predefined security code;

monitoring vehicle motion;

setting a security flag in the control computer in response to receiving the predefined security code if the security flag is not set and if the vehicle is stationary;

determining an engine operational state; and controlling the engine according to a secure mode of engine operation in response to a presence of the security flag in the control computer by disabling engine fueling to thereby prevent the engine from starting if the engine is not running, and by automatically shutting down the engine and disabling fueling to prevent restarting thereof if the engine is running.

24. The method of claim 23 further including the steps of:

clearing the security flag from the control computer in response to receiving the predefined security code if the security flag is set; and controlling the engine according to a normal mode of engine operation in response to an absence of the security flag in the control computer by allowing startup of the engine is not running.

* * * * *